Feb. 15, 1927.
G. GRUNBERG
PERFUME BOTTLE
Filed March 20, 1926
1,617,842
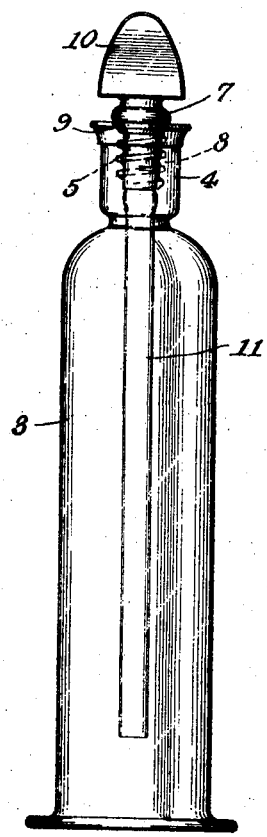
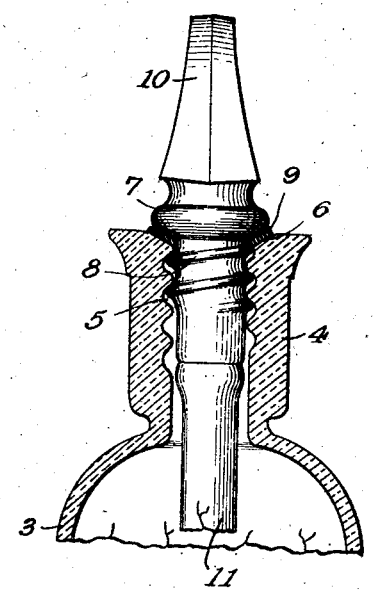
INVENTOR
George Grunberg
BY
Philip S. McLean
ATTORNEY Patented Feb. 15, 1927.

1,617,842

UNITED STATES PATENT OFFICE.

GEORGE GRUNBERG, OF NEW YORK, N. Y.

PERFUME BOTTLE.

Application filed March 20, 1926. Serial No. 96,177.

This invention relates particularly to bottles for carrying perfume and the like and special objects of the invention are to provide a relatively inexpensive, tight-fitting, secure, but readily opened stopper construction for containers of this nature.

The foregoing and other desirable objects are attained in part by making both the bottle and the stopper of glass, molding loosely fitting screw threads in the neck of the bottle and on the stem of the stopper respectively and providing a resilient packing at the base of the screw stem arranged to completely seal the joint when the stopper is screwed in place.

Other novel features of the invention will appear as the specification proceeds.

The drawing accompanying and forming part of this specification illustrates one simple, practical commercial development of the invention, but as this illustration is primarily for purposes of disclosure it will be understood that the structure may be modified as occasion requires, without departure from the broad spirit and scope of the invention as hereinafter defined and claimed.

Figure 1 is a side elevation of the invention as embodied in the form of a small perfume container.

Figure 2 is an enlarged broken sectional view of the neck portion of the bottle.

The bottle shown at 3 is of more or less ornamental form indicated as a container for perfume and the like, but the form and use of the bottle may vary.

One of the new features of this bottle is that there is molded in the neck portion 4 of the same, an integral internal screw thread 5. To provide ample material for this screw thread, the neck portion may be thickened or made with a relatively heavy wall, as indicated in Figure 2. At the mouth of the internal screw seat thus provided there is shown formed, a conical valve seat 6.

The stopper 7, like the bottle or vial, is formed of glass and is provided on the stem portion of the same with an external screw thread 8, making a free fitting or slightly loose engagement with the screw threads in the neck. This free fitting relation enables these parts to be made of glass and the screw engagement thus provided is a mechanical connection for forcing the stopper into the neck and not for effecting a seal between these parts.

The seal between the stopper and bottle neck is provided by a gasket 9 of rubber or the like engaged about the stem of the stopper at the base of the screw threads thereon and thereby carried by the stopper into sealing engagement with the valve seat 6. This gasket may simply be a small piece of rubber tubing or elastic band slipped over the stem of the stopper and held at the base of the same behind the screw threads thereon.

The stopper is provided with a suitable external handle 10 and may have attached directly thereto, an applicator rod 11 suitable for handling the perfume or other contents of the vial.

The internal screw threads may be made "oversize" with respect to the co-acting screw threads on the stopper by forming them wider and deeper than such co-acting threads, as indicated in Figure 2. This oversize relation allows for small irregularities in the two sets of threads and makes practicable the molding of these screw threads as integral parts of the bottle and stopper.

In addition to the advantages of simplicity and inexpensiveness, this construction is particularly neat and pleasing to the eye and provides great possibilities in the way of ornamentation by the use of specially colored glass and the like. The ring of packing material can be quite small and is so concealed when in use as to be practically unnoticeable, giving the article the appearance of being made entirely of glass. The applicator rod being smooth and round and of less diameter than the screw threaded portion of the stem serves as a guide and mandrel for first stretching and positioning the rubber ring and for holding it while it is being slipped over the larger screw threaded part to the conical seat provided for it by the tapered portion shown in Figure 2 as joining the head or handle with the base or outer end of the screw threaded part of the stem. The rings can thus be quickly stretched and accurately placed on the stems, without the exercise of any special care or skill.

What is claimed is:

A bottle for carrying perfume comprising a small glass vial having an internally, integrally screw threaded neck, a glass stopper having a head providing a finger-hold and an externally integrally screw threaded stem projecting therefrom, the screw thread of the neck being "oversize" with respect to the screw thread of the stem to compensate for inequalities in the molding of the screw threads in the cooperating glass members and to provide a loose free fitting engagement of these members, a resilient packing ring engaged about the stem of the stopper at the outer end of the screw threads thereon so as to be carried into sealing engagement with the end of the neck upon cooperative engagement of the loose fitting screw threads of the stopper and neck, the head of the stopper being tapered from the head portion down to the stem portion to provide a substantially conical seat for the packing ring and the screw stem having a smooth applicator rod of lesser diameter projecting therefrom and forming a guide for initially positioning the packing ring and facilitating the forcing of the same over the screw threads to the conical seat at the back of said threads.

In witness whereof, I have hereunto set my hand this 26 day of August, 1925.

GEORGE GRUNBERG.